(12) United States Patent
Schreter (10) Patent No.: US 10,348,817 B2
(45) Date of Patent: Jul. 9, 2019

(54) OPTIMIZING LATENCY AND/OR BANDWIDTH OF LARGE CLIENT REQUESTS FOR REPLICATED STATE MACHINES

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 15/601,694

(22) Filed: May 22, 2017

(65) Prior Publication Data
US 2018/0337980 A1   Nov. 22, 2018

(51) Int. Cl.
  *G06F 15/173*   (2006.01)
  *H04L 29/08*   (2006.01)
(52) U.S. Cl.
  CPC ...... *H04L 67/1012* (2013.01); *H04L 67/1095* (2013.01)
(58) Field of Classification Search
  USPC ...................................................... 709/226
  See application file for complete search history.

(56) References Cited

U.S. PATENT DOCUMENTS

| 7,185,236 B1* | 2/2007 | Moser ............... G06F 11/2028 709/209 |
| 8,341,118 B2* | 12/2012 | Drobychev .......... G06F 16/275 707/636 |
| 2018/0091588 A1* | 3/2018 | Qin ..................... H04L 67/1012 |
| 2018/0176300 A1* | 6/2018 | Chen .................. H04L 67/1095 |

* cited by examiner

*Primary Examiner* — Hee Soo Kim
(74) *Attorney, Agent, or Firm* — Mintz Levin Cohn Ferris Glovsky and Popeo, P.C.

(57) ABSTRACT

Network packets containing data of a data request received from a client machine by a leader replica of a cluster of replicas can be passed to follower replicas of the cluster, and a replicate request can be sent to the follower replicas after the network packets have been sent to the follower replicas. A mutation required by the data request can be recorded as committed upon receipt of replication confirmation messages from a quorum of the replicas, and the client machine can be notified that the mutation has been completed after the recording of the mutation as committed. In one option, the client machine can send the network packets to the leader replica, which in turn sends these network packets to the follower replicas. In another option, the client machine can send the network packets to the leader replica and to the follower replicas.

20 Claims, 5 Drawing Sheets

OPTIMIZING LATENCY AND/OR BANDWIDTH OF LARGE CLIENT REQUESTS FOR REPLICATED STATE MACHINES

TECHNICAL FIELD

The subject matter described herein relates to distributed computing systems, and in various aspects to communication between computing nodes of such systems.

BACKGROUND

Computing nodes (also referred to herein simply as "nodes") of a distributed computing system communicate over a communication network. Such computing nodes can be computing systems that each include at least one programmable processor. A distributed computing system can, in a non-limiting example, include a plurality of computing nodes that implement a distributed data storage application or any other kind of application in which exchange of messages, data, or the like between nodes occurs to enable replication of a state machine of the application between a plurality of replicas such that the replicas remain synchronized with regard to processes being executed by the distributed computing system. A process as used herein refers generally to any kind of data processing, data storage, or other computer-implemented process. A communication network can include one or more of a wired network, a wireless network, a local area network, a wide area network, an organization's intranet, the Internet, or the like. Typically, nodes in a distributed system use consensus protocols to coordinate replication of data among replicas maintained on several computing nodes of the distributed computing system to enable continued operation in case of a failure of one or more of the computing nodes. Other computing nodes of a plurality of computing nodes besides a computing node being referenced are generally referred to as "peer computing nodes" or simply "peers" of the computing node.

SUMMARY

Aspects of the current subject matter can support optimization of latency and network throughput in a distributed computing system. In various implementations, a leader replica of a cluster of replicas of an application implemented on a distributed computing system receives a data request, thereby resulting in passing of a plurality of network packets containing data of the data request to follower replicas of the cluster. The leader replica sends a replicate request to the follower replicas after the plurality of network packets of the data request have been sent to the follower replicas, and a mutation required by the data request is recorded as committed upon receipt of replication confirmation messages by the leader replica from a quorum of the replicas in the cluster. A client machine from which the data request was received is notified by the leader replica that the mutation has been completed after the recording of the mutation as committed.

In optional variations, the current subject matter includes a first option for having the network packets of the data request sent from the client machine to the leader replica and then on from the leader replica to the follower replicas and a second option for having the client machine send the network packets of the data request directly to the leader replica and to the follower replicas. The first option can advantageously be used when bandwidth between the client machine and the cluster is constrained relative to bandwidth between replicas within the cluster. The second option can advantageously be used when bandwidth between the client machine and the cluster is not constrained relative to bandwidth between replicas within the cluster.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Distributed computer systems typically use some kind of consensus protocol (for example, the Paxos protocol, the RAFT protocol, etc.) to achieve data replication and consistency across all replicas (e.g. of a data partition or some other state machine) in the system. A client machine generally connects to a currently-elected leader (e.g. a leader replica) of a plurality of replicas hosted across one or more computing nodes of the distributed system and sends one or more data requests to the leader replica. The leader replica then replicates mutate requests to other replicas in the cluster (i.e., all replicas except the leader replica itself) and ensures that a quorum is reached before replying to the client machine (i.e., a majority of the replicas including the leader replica have accepted the request).

Figure 1:
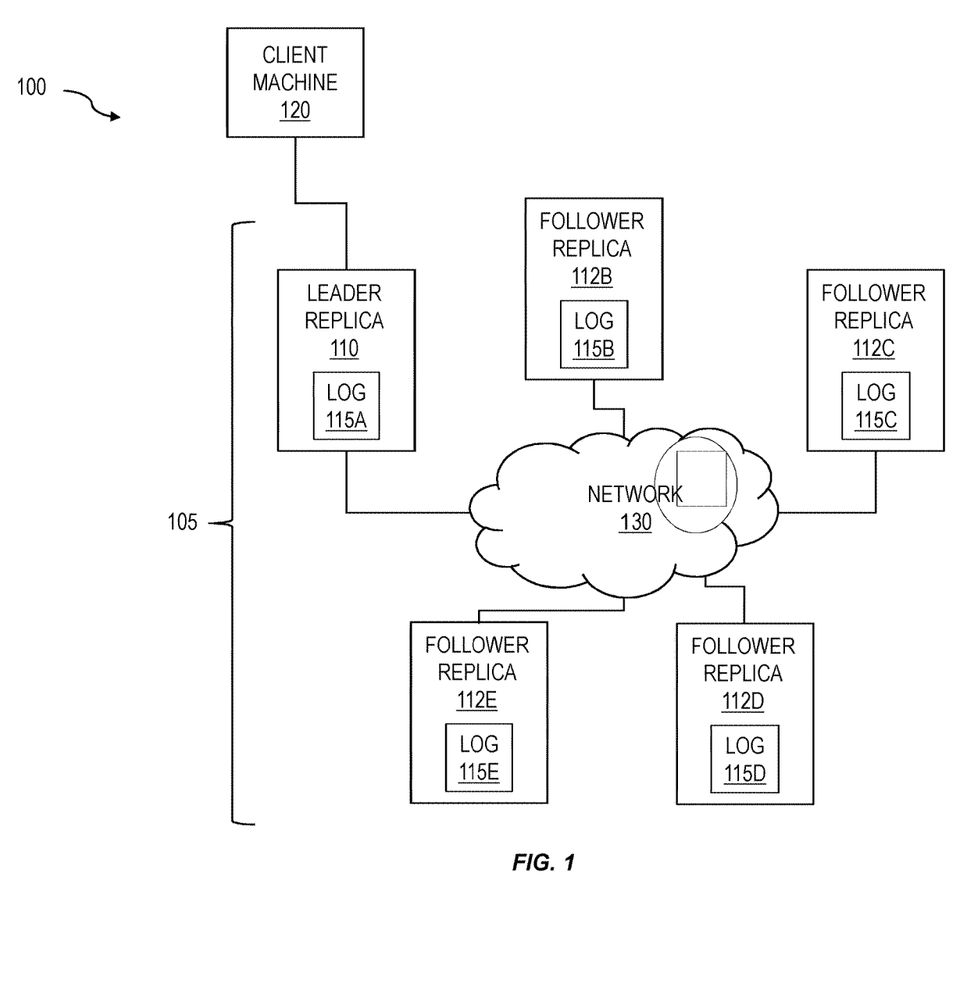
FIG. 1 shows a diagram illustrating aspects of a computing system arrangement having one or more features consistent with implementations of the current subject matter.

FIG. 1 shows a diagram of a system architecture 100 in which a consensus protocol is used in a cluster 105 of computing systems (e.g. nodes) to ensure that the replicas of a state machine of an application are kept in a consistent state based on a consensus among the replicas. The cluster 105 shown in FIG. 1 includes a first replica 110 and additional "follower replicas" 112B, 112C, 112D, 112E. Each replica includes a respective write-ahead log 115A, 115B, 115C, 115D, 115E. The cluster 105 can interact with one or more client machine(s) 120, for example over a network communication pathway 130 to receive and respond to requests, such as messages regarding new data values, updates to data values, deletion of values, etc. (which are generally referred to herein as data updates). A cluster may have a leader replica, which can be the replica in the cluster designated to receive client requests, which can occur in the form of data requests to mutate or otherwise change data stored by a data storage application or other requests that require some change in the state of the application. In some examples, any replica in the cluster 105 can act as the leader replica for a given request. In the example of FIG. 1, the first replica 110 acts as the leader replica. Follower replicas are collectively referred to herein as "follower replicas 112."

Further to the above summary, the RAFT protocol (which is a non-limiting example of a consensus protocol usable in distributed computing systems) classifies each replica in a cluster 105 as being in one of a follower state (e.g. a replica node), a candidate state, or a leader state (e.g. a state in which a master or leader replica operates). All replicas in a cluster 105 other than the leader replica 110 have the follower state and can be referred to as follower replicas 112. However, when a current replica fails to hear from a leader replica 110 of the cluster 105 within some period of time, the follower replica 112 can become a candidate and request votes from other replicas in the cluster 105 as part of a leader election process. The candidate becomes the leader replica 110 if it receives a majority of the votes from the replicas in the cluster 105.

A data update in an example in which one or more client machines communicates with a data storage application executing on a single node (e.g. computing system) does not involve any consensus issues—the data value being updated by interaction between a client machine 120 and the data storage application executing on the single node is whatever it is per the state of the single node. In a distributed approach such as that illustrated in FIG. 1, however, all of the replicas 110, 112B, 112C, 112D, 112E may not always be in perfect agreement regarding the state of the data value being updated. A consensus protocol such as those discussed above is typically used in such distributed data storage applications. Further with reference to FIG. 1, each of the replicas 110, 112B, 112C, 112D, 112E may be implemented on a separate computing node (e.g. a computing system), which can include one or more programmable processors that can be collocated, linked over one or more networks, etc., and can execute one or more modules, software components, or the like of the application (e.g. a data storage application). A data storage application can include one or more of a database, an enterprise resource program, a distributed storage system (e.g. NetApp Filer available from NetApp of Sunnyvale, Calif.), or the like. In some examples, the data storage application can support one or more multi-tenancy features, data security/encryption, cloud infrastructure features, and/or other enterprise-level capabilities.

The one or more modules, software components, or the like can be accessible to local users of the computing system as well as to remote users accessing the computing system from one or more client machines 120 over a network connection 130. One or more user interface screens produced by the one or more first modules can be displayed to a user, either via a local display or via a display associated with one of the client machines 120. Data units of a data storage application can be transiently stored in a persistence layer (e.g. a page buffer or other type of temporary persistency layer), which can write the data, in the form of storage pages, to one or more secondary (e.g. persistent) storages, for example via an input/output (I/O) subsystem. The one or more secondary storages can include one or more physical storage media or devices (e.g. hard disk drives, persistent flash memory, random access memory, optical media, magnetic media, and the like) configured for writing data for longer term storage. It should be noted that the secondary storage and the input/output subsystem 216 can be external or internal to a given computing node.

When a data request is received by a cluster of computing nodes on which a cluster 105 of replicas 110, 112B, 112C, 112D, 112E is implemented in a distributed computing system, for example from a client machine 120, it is necessary that the data request is eventually propagated to all replicas in the cluster 105. Replication of the data in the data request can require at least four transmissions of data messages (e.g. in the form of data packets, which can also be referred to as network packets): from a client machine making the request to the leader replica of a cluster of replicas, from the leader replica to all follower replicas of the cluster, from the follower replicas to the leader replica to confirm that the data request is committed at each follower replica, and from the leader replica back to the client machine to confirm that the data request is completed. Data messages sent from the client machine to the leader replica and from the leader replica to the follower replicas contain the whole data payload of the data request.

In an optimal case (e.g. for a data request that involves a relatively small amount of required data transfer, for example a sufficiently small amount of data to be entirely contained within a single data packet), a relatively small amount of latency is imposed on the system, as the data transfers between computing nodes are relatively small, and relatively little may be required for transmission over network connections and processing of the data at recipient computing nodes. However, in a case of a comparatively large request (e.g. starting at several tens of KBs or more), the network transfer load can be dominated by the messages from the client machine to the leader replica and from the leader replica to all follower replicas. These messages are each composed of data that is sent between computing nodes packaged into one or more network packets. This means that the leader replica's outgoing network bandwidth is taken mostly by messages (e.g. network packets) being replicated to follower replicas and the total latency is generally double of the latency needed to send the same request to an unreplicated system (this is also true for small requests, although because the overall network traffic is lower, it may not present as much of a system performance issue).

Figure 2:
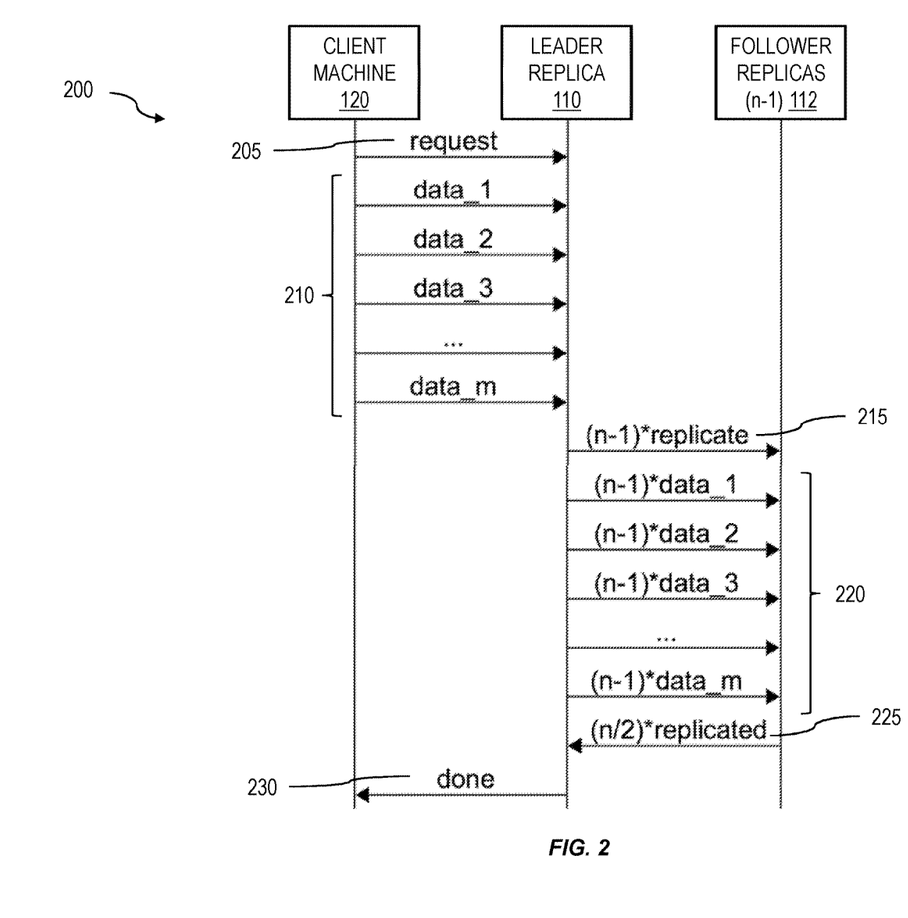
FIG. 2 shows a data flow diagram illustrating a conventional approach to replicating a data request.

FIG. 2 shows a data flow diagram 200 illustrating an example of replication of a data request 205 received at a leader replica 110 of a cluster containing n replicas (i.e. a leader replica 110 and n−1 follower replicas 112). This example is consistent with conventional approaches. The data request 205 is received from a client machine 120 by the leader replica 110 and passed on to each of the n−1 follower replicas 112 in the cluster as n−1 replicate requests 215. The data request 205 can involve transfer of data that are passed as one or more network packets 210 from the client machine 120 to the leader replica 110. A total of m network packets 210 containing data of the data request 205 are shown in the example shown in FIG. 2. The data of the data request 205 also need to be sent for replication to the n−1 follower replicas 112 in the cluster along with the n−1 replicate requests 215. Doing so therefore requires sending of m network packets 220 containing replication data of the data request 205 to each of the n−1 follower replicas 220. The sending of the n−1 replicate requests 215 and the m network packets 220 associated with each of the n−1 replicate requests 215 to the follower replicas 112 from the leader replica 110 is typically done serially (e.g. a replicate request 215 and all m replicate request network packets 220 containing data of the replicate request 215 are sent to each of the n−1 followers replicas 112 from the leader replica 110 one follower replica at a time. Alternatively, sending of the replicate request 215 and the m replicate request network packets 220 to the follower replicas 112 can be accomplished in two or more interleaved streams.

The leader replica 110 can record as committed any changes required by the data request 205 upon receiving replication confirmation messages 225 from a quorum of the replicas in the cluster 105. A quorum is generally at least half (e.g. n/2) of the replicas in the cluster 105. Upon receiving confirmation messages 225 from a quorum of the replicas in the cluster 105, the leader replica 110 notifies 230 the client machine 120 that whatever data mutations and/or other state changes are required by the data request 205 have been completed. In this example, the leader replica 110 initiates the sending of the replicate request 215 and the m replicate request network packets 220 to the n−1 follower replicas 112 after receiving all of the m network packets 210 of the data request 205. As noted above, such an approach can result in unacceptable system latency for large requests. The leader replica 110 must receive all of the data in the form of the m data request network packets 210 of the data request 205 before initiating transmission of the replicate request network packets 220 to the n−1 follower replicas 112 with the n−1 replicate requests 215.

Figure 3:
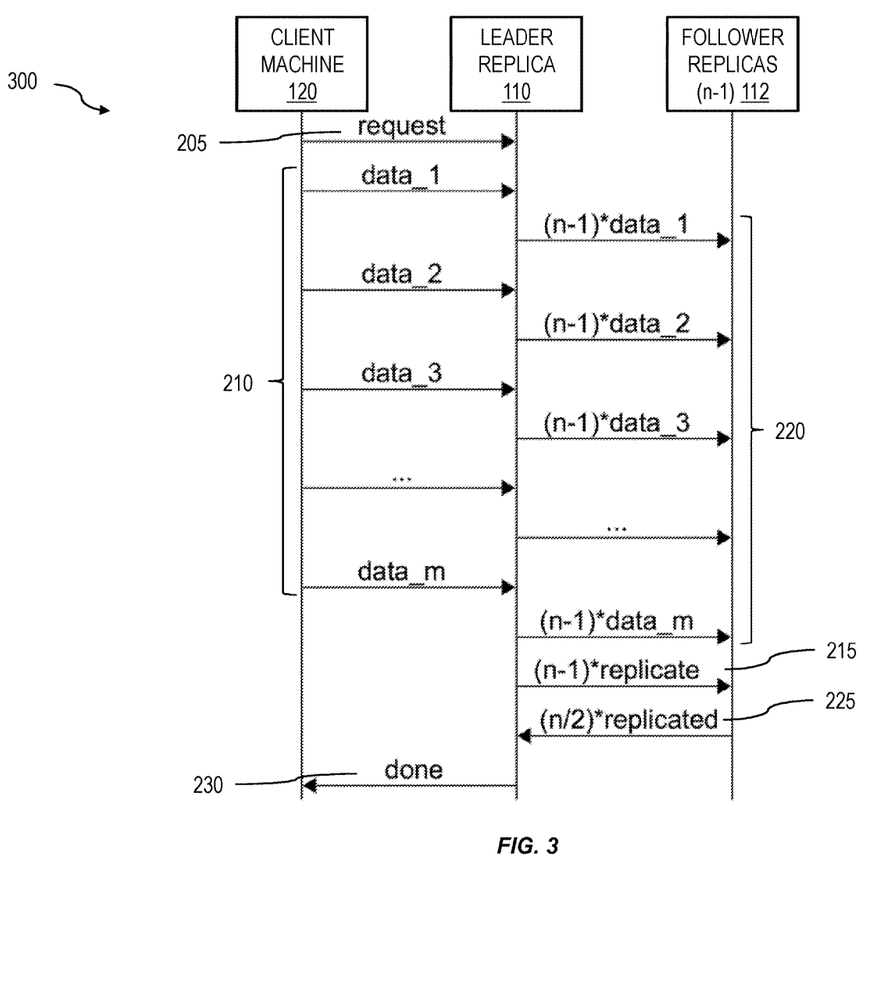
FIG. 3 shows a data flow diagram illustrating an approach to replicating a data request in which a client machine is bandwidth constrained for data communication with a cluster of computing nodes.
Figure 4:
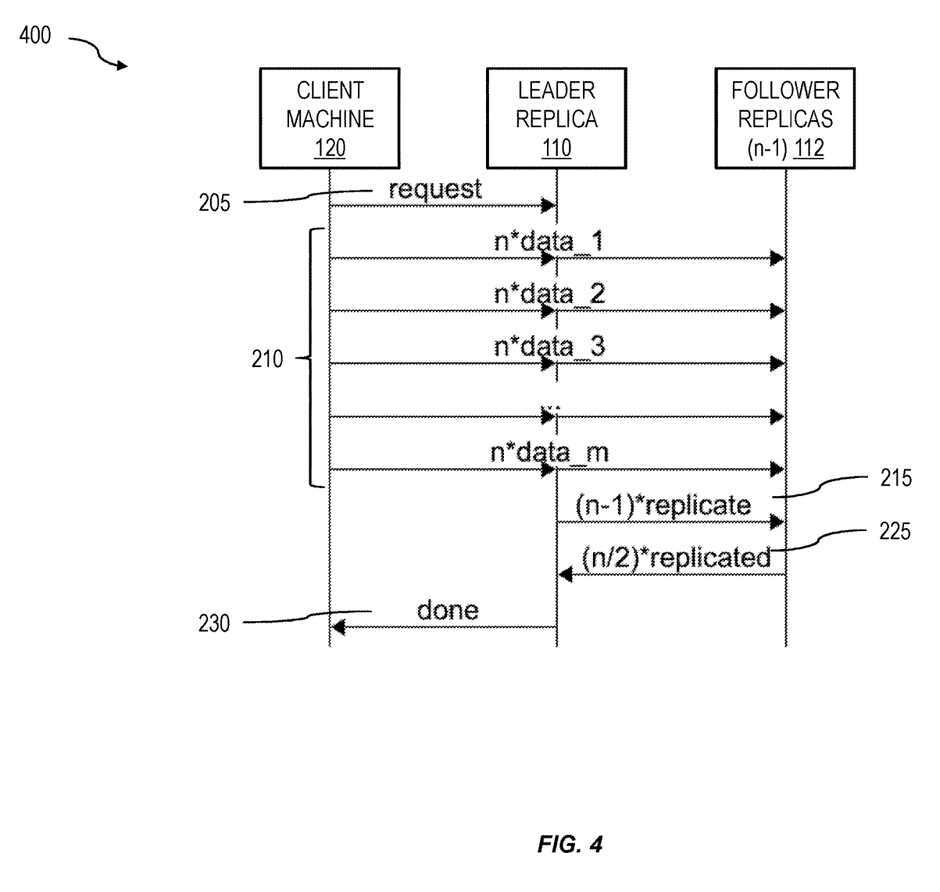
FIG. 4 shows a data flow diagram illustrating an approach to replicating a data request in which a client machine is not bandwidth constrained for data communication with a cluster of computing nodes.

Improvements in latency and/or bandwidth usage of such data requests can be achieved according to implementations of the current subject matter. The approaches herein can be useful at least in situations in which there are significantly more client machines in communication with the cluster 105 than there are server nodes in the cluster 105. FIG. 3 and FIG. 4 illustrate two example approaches. The FIG. 3 approach may provide benefits for a system configuration in which the client machine 120 is remote from the cluster 105 (e.g. outside of the group of computing nodes on which the cluster 105 of replicas is implemented) and has a limited total bandwidth to the cluster 105. The FIG. 4 approach may provide benefits for a system configuration in which a client machine 120 communicating with the cluster 105 has abundant bandwidth available for communicating with nodes in the cluster 105.

If bandwidth from the client machine 120 to the cluster 105 is limited, the leader replica 110 can, consistent with implementations of the current subject matter, begin replicating data, as received in the m data request network packets 210, to the n−1 follower replicas 112 as soon as the data request 205 and a first of the m data request network packets 210 is received. In other words, the leader replica 110 pre-replicates request data to the n−1 follower replicas 112, for example by sending on the m replication data network packets 220 as they arrive at the leader replica 110 rather than waiting for all of the m data request network packets 210 to be received by the leader replica 110. This pre-replication is done without actually sending the replicate request 215 itself to the n−1 follower replicas 112, as the replicate request 215 can only be completed by each follower replica 112 after all of the data (e.g. the m replication data network packets 220) are received by any given follower replica 112. After all of the m replication data network packets 220 are completely received, the replicate request 215 is sent to all of the followers which then can immediately process already-received data and quickly respond to the leader replica 110 after processing the replicate request 215. When at least a quorum (i.e. n/2) of the replicas reply to the leader replica 110 with replication confirmation messages 225, the leader replica 110 can record as committed any changes required by the data request and can reply to the client machine 120 to notify 230 the client machine 120 that whatever data mutations and/or other state changes are required by the data request 205 have been completed.

Assuming processing time (e.g. by the follower replicas 112) is small compared to network latency, the latency can be reduced using this approach from approximately 2 m+4 network packets (which would be necessary in the conventional approach described above in reference to FIG. 2) to m+5 network packets. With larger m, this asymptotically approaches a non-replicated latency of m+2 packets (especially considering that non-data request/response packets are small ones and thus their latencies are in fact significantly smaller as full data packets). In other words, under these conditions $$\lim_{m \to \infty} \frac{m+5}{m+2} = 1,$$

which is same latency as a single-node system, as opposed to $$\lim_{m \to \infty} \frac{2m+4}{m+2} = 2$$

with multicast packets from the leader to all followers, which is approximately double latency, or even (more realistic, with TCP/IP)

$$\lim_{m \to \infty} \frac{m + (n-1)m}{m+2} = n,$$

meaning that for a 3-node system, the resulting latency is approximately three times the latency of a single-node system.

With regards to bandwidth demands, it is noted that not all networks support multicasting (for example, come cloud providers such as Amazon Web Services, available from Amazon, Inc. of Seattle, Wash., do not), so a protocol consistent with implementations of the current subject matter may need to use unicast messaging. Assuming a sufficient number of clients to load the system to the maximum capacity, the maximum bandwidth achievable to the system may be only 1/(n−1)th of the outgoing bandwidth of the leader replica 110. Namely, the system needs to replicate all incoming data to (n−1) follower replicas 112. This situation may not be an improvement over the conventional solution.

However, assuming the bandwidth from client machines to the cluster is similar than between nodes in the cluster (which is a typical situation in data centers) and the system is not overloaded (also a typical situation—systems are generally sized to have some reserves), the approach described in relation to FIG. 3 still provides improvements in reduced latency. Only for truly remote clients where the bandwidth from the client to the cluster is a significant bottleneck the latency improvement will diminish proportional to bandwidth ratio.

In some implementations of the current subject matter, further improvements may be possible for a data request 205 sent from a remote client machine 120. For example, if multicasting is available, it would be possible to treat the remote client machine 120 as a local client machine (see below), thus optimizing bandwidth of the system also for remote clients. Similarly, it would be in this case also be possible to compute the quorum at the client machine 120 to save one network packet. However, this approach may be counterproductive in cases where the client machine's 120 bandwidth is limited and transfer of n reply packets takes more than local transfer of (n−1) packets to the leader replica 110 and transfer of one packet from the leader replica 110 to the client machine 120.

In a situation in which multicasting from a client machine 120 to all replicas in the cluster 105 (both follower replicas 112 and the leader replica 110) is possible, improvements may be realized by eliminating the need to replicate data from the leader replica 110 to the n−1 follower replicas 112 by simply having the client machine 120 send the data associated with the data request 205 directly to the leader replica 110 and the n−1 follower replicas 112. This approach, which is illustrated in FIG. 4, may be useful in a situation in which the client machine 120 is local to the cluster 105 and therefore is not bandwidth constrained, and may result in a total latency of m+4 packets. Furthermore, the outgoing bandwidth of the leader replica 110 needs to used only for small control messages. Thus, the total capacity of the system is only limited by the incoming bandwidth of the individual nodes of the system, such that it can be n−1 times higher than in cases in which the client machine 120 communicates only with the leader replica 110. When multicasting is possible, one client machine 120 could theoretically use the system to 100%.

Referring again to FIG. 4, the client machine 120 sends the data request 205 to the leader replica 110. However, rather than sending the m network packets 210 containing data of the data request 205 only to the leader replica 110, instead the client machine 120 sends just the data request 120 to the leader replica 110 while sending the m network packets 210 containing data of the data request 205 to all n replicas (i.e. both the leader replica 110 and the n−1 follower replicas 112) of the cluster 105. The leader replica 110 sends the replicate request 215 to the n−1 follower replicas upon its receipt of the last of the m network packets 210 containing data associated with the data request 205. When at least a quorum (i.e. n/2) of the replicas reply to the leader replica 110 with replication confirmation messages 225, the leader replica 110 can record as committed any changes required by the data request and can reply to the client machine 120 to notify 230 the client machine 120 that whatever data mutations and/or other state changes are required by the data request 205 have been completed.

Again, because some networks do not support multicasting, the client can send packets to all replicas in the cluster 105 via unicast messages, which can be interleaved as necessary. This approach requires n times higher outgoing bandwidth on the client machine 120 compared to multicast messaging. However, considering there may be many client machines (typically >>n) accessing the system, the 1/nth of aggregated outgoing bandwidth of all client machines is more than sufficient to fully load the system. While unicasting the messages for each replica from the client machine might be assumed add latency, in real-world situations a single client machine generally competes with other client machines for the network bandwidth to the leader replica 110. So, it will nonetheless only get 1/k-th of the bandwidth to each node, where k client machines are currently accessing the system. Thus, if k>=n (which is typically true), the client machine 120 will not experience latency disadvantages by unicasting messages to all replicas in the cluster 105.

Normally, the consensus protocol (e.g., RAFT) is responsible for re-replicating any data from leader to failed follower replicas 112 and/or when connection to some follower replica 112 temporarily fails. This is not easily possible when the client machine 120 directly sends data to all replicas in the cluster 105. However, it can be easily solved by follower replicas 112 actively requesting missing data from the leader replica 110 in case some messages from the client machine 120 to them got lost (e.g., due to transient network failures). Considering that packet loss on switched packet networks is nowadays virtually non-existent (unless they are overloaded), this should happen only very rarely and can be ignored for performance considerations (also in this case, the quorum of replicas decides request acceptance, so communication to at least half of the replicas would have to be affected to get noticeable performance degradation).

In some implementations of the current subject matter, further improvements may be possible for a data request sent from a local client. For example, instead of treating the data request 205 and the data (e.g. as in the network packets 210 discussed above) separately, the data request 205 can also be pre-replicated to follower replicas 112 from the client machine 120. Such an approach could save an additional network packet, which could slightly improve the latency. In another example of a possible improvement within the scope of the current subject matter, instead of replying to the client machine 120 from the leader replica 110, each follower replica 112 might send its replication confirmation message 225 reply to the client machine 225 (and also to the leader replica 110). In this manner, the client machine can compute a quorum by itself, saving one network packet latency. While this occurs at the expense of more incoming packets to the client machine 120, this approach may be used when sufficient bandwidth is available to minimize the impact.

Figure 5:
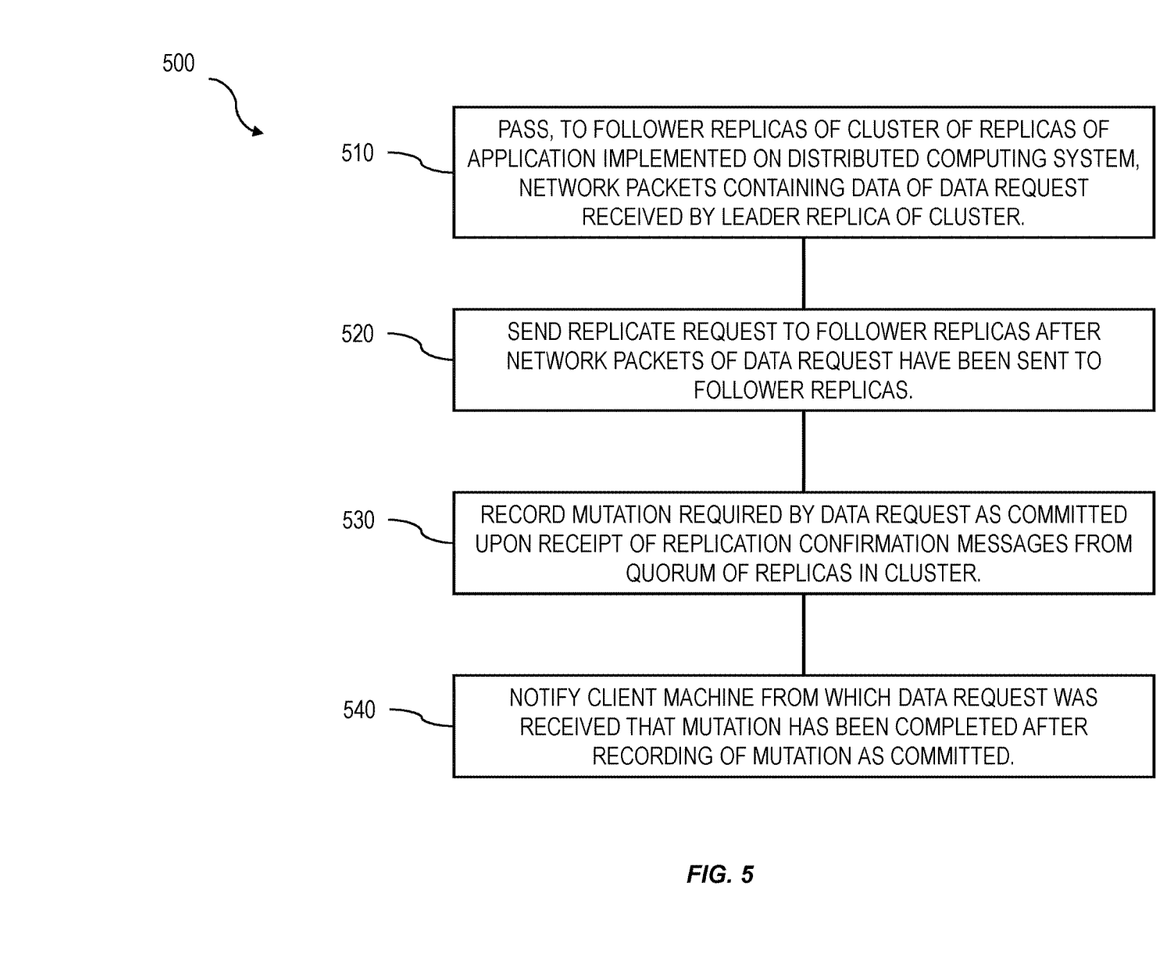
FIG. 5 shows a process flow diagram illustrating aspects of a method having one or more features consistent with implementations of a first aspect of the current subject matter.

FIG. 5 shows a process flow chart 500 illustrating features that can be included in a method consistent with implementations of the current subject matter. At 510, a plurality of network packets containing data of a data request received by a cluster of replicas of an application of a distributed computing system comprising a plurality of computing nodes are passed to follower replicas of the cluster. The data request is received by a leader replica of the cluster from a client machine. At 520, the method further includes sending a replicate request to the follower replicas after the plurality of network packets of the data request have been sent to the follower replicas. In some implementations of the current subject matter, the leader replica of the cluster can send the replicate request to the follower replicas.

A mutation required by the data request is recorded at 530 as committed upon receipt of replication confirmation messages at the leader replica from a quorum of the replicas in the cluster. In some implementations of the current subject matter, a leader replica of the cluster records the mutation required by the data request as committed upon receipt of replication confirmation messages from the quorum of the replicas in the cluster.

The leader replica notifies the client machine from which the data request was received at 540 that the mutation has been completed. The notifying is performed by the leader replica of the cluster after the recording of the mutation as committed.

In some implementations of the current subject matter, it can be determined that the client machine is a remote client machine having a bandwidth constraint for data transmission to the cluster. The constraint can be considered as a bandwidth limitation relative to bandwidth available for data transfer between replicas of the cluster. In response to this determining, the leader replica of the cluster begins sending network packets of the plurality of network packets comprising the data of the request on to the follower replicas before receiving all network packets of the plurality of network packets.

In other implementations of the current subject matter, it can be determined that the client machine is a local client machine (or some other machine whose bandwidth for data transmission with the cluster is not constrained or limited relative to bandwidth available for data transfer between replicas of the cluster). In response to this determining, the client machine sends the plurality of network packets directly to the leader replica and to the follower replicas. The leader replica receives the data request from the client machine, and sends the replicates requests to the followers once all of the network packets have been sent to the follower replicas directly by the client machine. The follower replicas send the replication confirmation messages to the leader replica, and the leader replica in turn sends the notification that the mutation has been completed on to the client machine when the leader replica has received replication confirmation messages from a quorum of the replicas of the cluster.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   passing, to follower replicas of a cluster of replicas of an application implemented on a distributed computing system, a plurality of network packets containing data of a data request received by a leader replica of the cluster of replicas, the distributed computing system comprising a plurality of computing nodes;
   sending a replicate request to the follower replicas after the plurality of network packets of the data request have been sent to the follower replicas;
   recording a mutation required by the data request as committed upon receipt of replication confirmation messages from a quorum of the replicas in the cluster;
   notifying, by the leader replica of the cluster after the recording of the mutation as committed, a client machine from which the data request was received that the mutation has been completed.

2. A computer-implemented method as in claim 1, further comprising determining that the client machine is a remote client machine having a bandwidth constraint for data transmission to the cluster.

3. A computer-implemented method as in claim 2, wherein the leader replica receives the plurality of network packets comprising the data of the request from the client machine and begins the passing the network packets on to the follower replicas before receiving all network packets of the plurality of network packets.

4. A computer-implemented method as in claim 1, wherein the leader replica of the cluster records the mutation required by the data request as committed upon receipt of replication confirmation messages from the quorum of the replicas in the cluster.

5. A computer-implemented method as in claim 1, wherein the replication confirmation messages are received by the leader replica from the quorum of the replicas in the cluster.

6. A computer-implemented method as in claim 1, further comprising determining that the client machine is a local client machine whose bandwidth for data transmission with the cluster is not constrained relative to bandwidth between replicas in the cluster.

7. A computer-implemented method as in claim 6, wherein the client machine sends the plurality of network packets directly to the leader replica and to the follower replicas.

8. A computer program product comprising a non-transitory machine-readable medium storing instructions that, when executed by at least one programmable processor, cause the at least one programmable processor to perform operations comprising:
   passing, to follower replicas of a cluster of replicas of an application implemented on a distributed computing system, a plurality of network packets containing data of a data request received by a leader replica of the cluster of replicas, the distributed computing system comprising a plurality of computing nodes;
   sending a replicate request to the follower replicas after the plurality of network packets of the data request have been sent to the follower replicas;
   recording a mutation required by the data request as committed upon receipt of replication confirmation messages from a quorum of the replicas in the cluster;
   notifying, by the leader replica of the cluster after the recording of the mutation as committed, a client machine from which the data request was received that the mutation has been completed.

9. A computer program product as in claim 8, wherein the operations further comprise determining that the client machine is a remote client machine having a bandwidth constraint for data transmission to the cluster.

10. A computer program product as in claim 9, wherein the leader replica receives the plurality of network packets comprising the data of the request from the client machine and begins the passing the network packets on to the follower replicas before receiving all network packets of the plurality of network packets.

11. A computer program product as in claim 8, wherein the leader replica of the cluster records the mutation required by the data request as committed upon receipt of replication confirmation messages from the quorum of the replicas in the cluster.

12. A computer program product as in claim 8, wherein the replication confirmation messages are received by the leader replica from the quorum of the replicas in the cluster.

13. A computer program product as in claim 8, wherein the operations further comprise determining that the client machine is a local client machine whose bandwidth for data transmission with the cluster is not constrained relative to bandwidth between replicas in the cluster.

14. A computer program product as in claim 13, wherein the client machine sends the plurality of network packets directly to the leader replica and to the follower replicas.

15. A system comprising computer hardware configured to perform operations comprising:
   passing, to follower replicas of a cluster of replicas of an application implemented on a distributed computing system, a plurality of network packets containing data of a data request received by a leader replica of the cluster of replicas, the distributed computing system comprising a plurality of computing nodes;
   sending a replicate request to the follower replicas after the plurality of network packets of the data request have been sent to the follower replicas;
   recording a mutation required by the data request as committed upon receipt of replication confirmation messages from a quorum of the replicas in the cluster;
   notifying, by the leader replica of the cluster after the recording of the mutation as committed, a client machine from which the data request was received that the mutation has been completed.

16. A system as in claim 15, wherein the operations further comprise determining that the client machine is a remote client machine having a bandwidth constraint for data transmission to the cluster, and wherein the leader replica receives the plurality of network packets comprising the data of the request from the client machine and begins the passing the network packets on to the follower replicas before receiving all network packets of the plurality of network packets.

17. A system as in claim 15, wherein the leader replica of the cluster records the mutation required by the data request as committed upon receipt of replication confirmation messages from the quorum of the replicas in the cluster.

18. A system as in claim 15, wherein the replication confirmation messages are received by the leader replica from the quorum of the replicas in the cluster.

19. A system as in claim 15, wherein the operations further comprise determining that the client machine is a local client machine whose bandwidth for data transmission with the cluster is not constrained relative to bandwidth between replicas in the cluster, and wherein the client machine sends the plurality of network packets directly to the leader replica and to the follower replicas.

20. A system as in claim 15, wherein the computer hardware comprises at least one programmable processor and a machine-readable medium storing instructions that, when executed by the at least one programmable processor, cause the at least one programmable processor to perform the operations.

* * * * *